United States Patent
Van Bommel et al.

(10) Patent No.: US 10,917,955 B2
(45) Date of Patent: Feb. 9, 2021

(54) LIGHTING DEVICE

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/646,090

(22) PCT Filed: Sep. 7, 2018

(86) PCT No.: PCT/EP2018/074125
§ 371 (c)(1),
(2) Date: Mar. 10, 2020

(87) PCT Pub. No.: WO2019/048605
PCT Pub. Date: Mar. 14, 2019

(65) Prior Publication Data
US 2020/0281062 A1    Sep. 3, 2020

(30) Foreign Application Priority Data

Sep. 11, 2017 (EP) .................. 17190286

(51) Int. Cl.
| H05B 37/02 | (2006.01) |
| H05B 39/04 | (2006.01) |
| H05B 41/36 | (2006.01) |
| H05B 47/11 | (2020.01) |
| H05B 45/20 | (2020.01) |
| H05B 45/3577 | (2020.01) |
| F21V 23/00 | (2015.01) |
| F21Y 115/10 | (2016.01) |

(52) U.S. Cl.
CPC ............ *H05B 47/11* (2020.01); *F21V 23/003* (2013.01); *H05B 45/20* (2020.01); *H05B 45/3577* (2020.01); *F21Y 2115/10* (2016.08)

(58) Field of Classification Search
None
See application file for complete search history.

(56) References Cited

U.S. PATENT DOCUMENTS 10,321,532 B2 * 6/2019 Bruwer ................ H05B 45/10
10,624,189 B1 * 4/2020 Wang .................... H05B 47/10
(Continued)

FOREIGN PATENT DOCUMENTS

CN    104406101 A    3/2015

*Primary Examiner* — Anh Q Tran
(74) *Attorney, Agent, or Firm* — Daniel J. Piotrowski (57) ABSTRACT

There is provided a lighting device (1) comprising a lighting unit (2) configured to emit light and a control unit (3) configured to control the light emitted by the lighting unit (2), wherein the control unit (3) is configured to change the intensity of the light emitted by the lighting unit (2) at least from a high setting (8) via a mid setting (7) to a low setting (6) and/or vice versa, wherein the intensity of the high setting is greater than the 5 intensity of the mid setting, wherein the intensity of the mid setting is greater than the intensity of the low setting, and wherein the low setting (6) and the high setting (8) each gives a higher color temperature of the light emitted by the lighting unit (2) than the mid setting (7).

14 Claims, 11 Drawing Sheets

(56) References Cited

U.S. PATENT DOCUMENTS

| | | |
|---|---|---|
| 2010/0084996 A1 | 4/2010 | Van Des Sluis et al. |
| 2013/0057157 A1 | 3/2013 | Nackaerts et al. |
| 2013/0119891 A1 | 5/2013 | Herremans et al. |
| 2013/0328500 A1 | 12/2013 | Toda |
| 2015/0022093 A1 | 1/2015 | Smith et al. |
| 2016/0316527 A1 | 10/2016 | Allen et al. |
| 2016/0323972 A1 | 11/2016 | Bora et al. |
| 2016/0366746 A1 | 12/2016 | Van De Ven et al. |
| 2017/0127485 A1* | 5/2017 | Hsia ................... H05B 45/60 |
| 2018/0077783 A1* | 3/2018 | Sooch .................. H05B 47/16 |

* cited by examiner

LIGHTING DEVICE

CROSS-REFERENCE TO PRIOR APPLICATIONS

This application is the U.S. National Phase application under 35 U.S.C. § 371 of International Application No. PCT/EP2018/074125, filed on Sep. 7, 2018, which claims the benefit of European Patent Application No. 17190286.9, filed on Sep. 11, 2017. These applications are hereby incorporated by reference herein.

FIELD OF THE INVENTION

The present invention relates to a lighting device, a lighting apparatus comprising at least one such lighting device, and a method of controlling a lighting device. The present lighting device can be used for functional lighting and for night lighting.

BACKGROUND OF THE INVENTION

Nightlights have much less intensity than regular bulbs and luminaires. The light intensity is usually just enough to see the room and objects in it, but not so bright that it stops you from falling asleep. It also helps children that they do not wake up and find themselves in total darkness. It feels like sleeping and seeing the moonlight if you wake up at night.

CN104406101 discloses an LED ceiling lamp with adjustable brightness and color temperature. The LED ceiling lamp with adjustable brightness and color temperature has the advantages as follows: the brightness and color temperature can be adjusted automatically according to change of the external environment, or various profiles are defined by a user, so that appropriate brightness and color temperature can be selected by one key, for example, the highest brightness and daylight color temperature can be provided for a reading mode, the brightness and color temperature can be reduced to those of a night light for a sleep mode and the lamp can be automatically turned off in a time delayed manner, and the like.

US 2010/0084996 discloses a lighting interaction system that includes at least one light source to provide illumination and/or a light effect having variable light attributes, and a selection indicator having a plurality of indicators associated with light settings. Activation of the selector controls the light sources to provide light having first light attributes associated with the first indicator. In a dynamic mode, alignment of a pointer with the various indicators changes as a function of time to point to different indicators and change the first light attributes in accordance with the currently aligned indicator.

SUMMARY OF THE INVENTION

It is an object of the present invention to provide an improved or alternative lighting device that can be used for functional lighting as well as night lighting.

According to a first aspect of the invention, this and other objects are achieved by a lighting device comprising a lighting unit configured to emit light and a control unit configured to control the light emitted by the lighting unit, wherein the control unit is configured to change the intensity of the light emitted by the lighting unit at least from a high setting via a mid setting to a low setting and/or vice versa (i.e. from the low setting via the mid setting to the high setting), wherein the intensity of the high setting is greater than the intensity of the mid setting, wherein the intensity of the mid setting is greater than the intensity of the low setting, and wherein the low setting and the high setting each gives a higher color temperature of the light emitted by the lighting unit than the mid setting, and wherein the color temperature of the low setting is greater than the color temperature of the high setting.

The high setting (high intensity; "higher" color temperature) can be used for functional lighting, and the low setting (low intensity; "higher" color temperature) can be used for night lighting.

The present invention is based on the understanding that a high color temperature is beneficial for night lighting or nightlights, as it mimics the light from the Moon, which will give a feeling of relaxation that is beneficial for sleep and rest. In general, the color temperature of the high setting will be lower than the color temperature of the low setting. This is normally the case as in most buildings the artificial light is in the range of 2700 to 3500K, while the color temperature of the moon is in the range 3900 to 4300K. Furthermore, the mid setting provides for a true multifunctional lighting device.

The control unit may be operable to simultaneously and gradually change the intensity and color temperature of the light emitted by the lighting unit between the three settings. By gradually changing the intensity and color temperature between the settings, a dimmer or dimming function is realized, and desired lighting can be achieved for a wide range of applications. Alternatively, the control unit may be operable to simultaneously but discretely change the intensity and color temperature of the light emitted by the lighting unit between the three settings.

The control unit may be configured stop decreasing and start increasing the color temperature of the light emitted by the lighting unit, while changing the intensity, at a breakpoint lumen output of the lighting unit in the range of 50-100 lm, preferably in the range of 50-80 lm, and more preferably in the range of 50-70 lm. In other words, the color temperature has a minimum at the breakpoint lumen output.

The gradual change in color temperature of the light emitted by the lighting unit may follow the black body line (BBL; also referred to as black body locus or Planckian locus). The gradual change in color temperature may alternatively be close to the BBL (for example within 20 SDCM, more preferably within 15 SDCM, and most preferably within 10 SDCM), or follow the black body line only at high color temperatures (for example >3000 K or >4000 K). Being close to the BBL mimics incandescent light to a better extent.

The control unit may comprise a user interface including input means configured to allow a user to simultaneously and gradually change the intensity and color temperature of the light emitted by the lighting unit from the high setting to the mid setting and further to the low setting and/or vice versa. The user interface could be a dedicated user interface, or it could be embodied as an application on a smartphone or tablet or smartwatch or computer, for example. Also, the user interface could include physical button or the like (the aforementioned input means may for example be a sliding button or a turning button), or the user interface could be "virtually" provided on a screen, for example a touchscreen, or the user interface could be a voice control user interface, for example.

The high setting may have a color temperature above 2700K, preferably above 3000K, and more preferably above 3500K, wherein the mid setting may have a color temperature below 2700K, preferably below 2600K, and more preferably below 2500K, and wherein the low setting may have a color temperature above 2700K, preferably above 3000K, and more preferably above 3500K. The low setting may for example a color temperature in the range from 3900 to 4300 K (this is typically the color temperature of the Moon).

The color temperature of the low setting may be greater than the color temperature of the high setting, wherein the color temperature of the high setting is greater than the color temperature of the mid setting. Alternatively, the color temperature of the high setting may be greater than the color temperature of the low setting, wherein the color temperature of the low setting is greater than the color temperature of the mid setting. That is, the color temperature of the high setting may be either lower or higher than the color temperature of the low setting, to accommodate for preference of color temperature of functional lighting (the high setting).

The light emitted by the lighting unit in the high setting may have a different spectrum than the light emitted by the lighting unit in the low setting, even if the emitted light has the same (high) color temperature in both settings. This serves to mimic daylight and nightlight. The light emitted by the lighting unit in the high setting ("daylight") can for example be made with blue light having a wavelength peak in the range of 460 to 480 nm, and the light emitted by the lighting unit in the low setting ("nightlight") can be made with blue light having a wavelength peak in the range of 440 to 460 nm. An advantage of this is that the light emitted by the lighting unit in the high setting may improve alertness and cognitive performance due to melatonin suppression, whereas the light emitted by the lighting unit in the low setting less effects alertness.

To achieve the aforementioned different spectra, the lighting unit may comprise at least one of: at least two selectively activable blue light sources adapted to emit blue light with mutually different wavelength peaks (for example 470 nm for the high setting and 440 nm for the low setting); and at least two selectively activable red light sources adapted to emit red light with mutually different wavelength peaks (for example 625 nm for the high setting and 660 nm for the low setting).

The lighting unit may comprise a first phosphor converted light emitting diode adapted to emit white light of a first color temperature and a second phosphor converted light emitting diode adapted to emit white light of a second color temperature which is different than the first color temperature. In this way, the high, mid and low settings may be achieved by appropriately combining or mixing light of the phosphor converted light emitting diodes using only two light sources.

The control unit may be configured to adjust the intensity and color temperature of the low setting based on data of the lunar cycles of the Moon. For example, at full moon the low setting may have higher intensity and color temperature than at other lunar cycles (moon phases). The data of the lunar cycles of the Moon could be received from the outside or stored locally in the lighting device.

According to a second aspect of the invention, there is provided a lighting apparatus comprising at least one lighting device according to the first aspect. The lighting could for example be a lamp or a luminaire.

The lighting apparatus may further comprise a light exit window or surface, wherein the control unit of each lighting device is configured to stop decreasing and start increasing the color temperature of the light emitted by the lighting unit, while changing the intensity, at an intensity at the light exit window or surface below 0.5 lm/cm$^2$, preferably below 0.4 lm/cm$^2$, and more preferably below 0.3 lm/cm$^2$.

According to a third aspect of the invention, there is provided a method of controlling light emitted by a lighting unit, which method comprises: changing the intensity of the light emitted by the lighting unit at least from a high setting via a mid setting to a low setting and/or vice versa, wherein the intensity of the high setting is greater than the intensity of the mid setting, wherein the intensity of the mid setting is greater than the intensity of the low setting, and wherein the low setting and the high setting each gives a higher color temperature of the light emitted by the lighting unit than the mid setting. This aspect may exhibit the same or similar features and technical effect as the previous aspects, and vice versa.

It is noted that the invention relates to all possible combinations of features in the claims.

BRIEF DESCRIPTION OF THE DRAWINGS

The present invention will be described in more detail with reference to the appended drawings, showing currently preferred embodiments of the invention.

As illustrated in the figures, the sizes of layers and regions may be exaggerated for illustrative purposes and, thus, may be provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Intensities and/or color temperatures as indicated herein may be measured using an integrating sphere.

Figure 1:
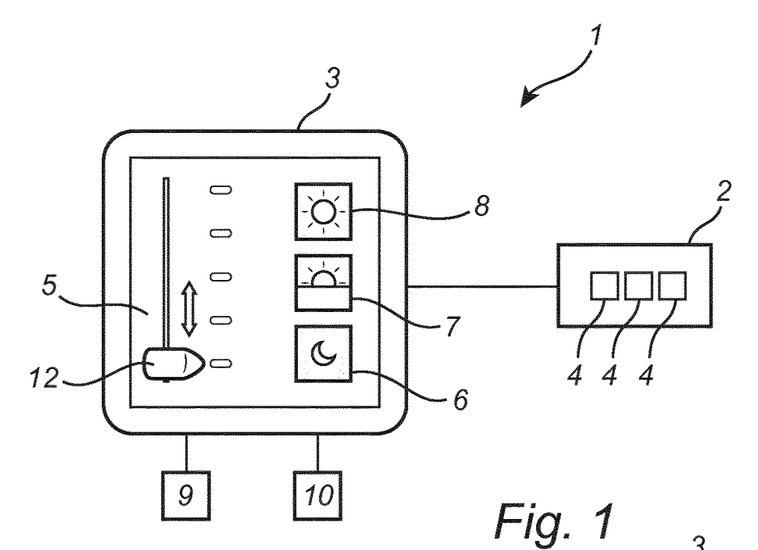
FIG. 1 is a schematic view of a lighting device according to an embodiment of the invention.

FIG. 1 shows a lighting device 1 according to an embodiment of the invention. The lighting device 1 comprises a lighting unit 2 and a control unit 3.

The lighting unit 2 is generally configured to emit light. The lighting unit 2 may comprise a plurality of light sources 4, for example light emitting diodes, which will be discussed further below. The lighting unit 2 may be configured to emit light in a color temperature range between 500 K and 20 000 K, preferably between 800 K and 10 000 K, more preferably between 1000 K and 6000 K.

The control unit 3 is connected to the lighting unit 2. The control unit 3 typically has a user interface 5. The user interface 5 could be a dedicated user interface, or it could be embodied as an application or software on a smartphone or tablet or smartwatch or computer, for example. Also, the user interface 5 could include physical button or the like, or the user interface could be "virtually" provided on a screen, for example a touchscreen, or the user interface 5 could be a voice control user interface.

The control unit 3 is generally configured to control the light emitted by lighting unit 2. In particular, with further reference to FIG. 2, the control unit 3 is configured to change typically as a response to input from a user (not shown) via the user interface 5 the intensity of the light emitted by the lighting unit 2 from a high setting 8 via a mid setting 7 to a low setting 6 and/or vice versa, wherein the low and high settings 6 and 8 each gives a higher color temperature of the light emitted by the lighting unit 2 than the mid setting 7. The high setting 8, which may be used for function lighting ("daylight"), can have a high intensity and high color temperature, e.g. 5 lm/cm$^2$ at 4000 K. The mid setting 7 can for example be 1 lm/cm$^2$ at 2000 K. The low setting 6, which may be used for night lighting, can have a very low intensity and a high color temperature, e.g. 0.2 lm/cm$^2$ at 4150 K.

Figure 2:
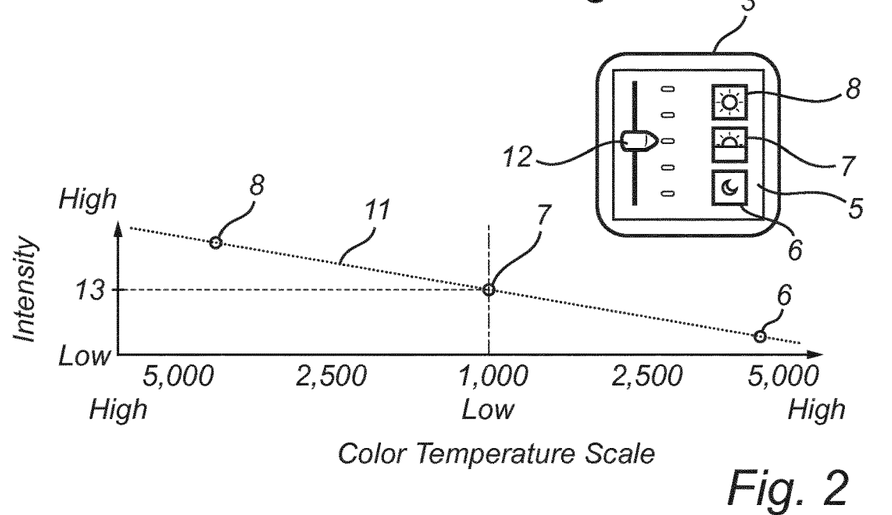
FIG. 2 shows intensity and color temperature of the lighting device of FIG. 1.

Generally, the high setting 8 may have a color temperature above 2700K, preferably above 3000K, and more preferably above 3500K, wherein the mid setting 7 has a color temperature below 2700K, preferably below 2600K, and more preferably below 2500K, and wherein the low setting 6 has a color temperature above 2700K, preferably above 3000K, and more preferably above 3500K. Furthermore, the color temperature of the low setting 6 may be greater than the color temperature of the high setting 8, wherein the color temperature of the high setting 8 is greater than the color temperature of the mid setting 7 (as in the above example). Alternatively, the color temperature of the high setting 8 may be greater than the color temperature of the low setting 6, wherein the color temperature of the low setting is greater than the color temperature of the mid setting. Furthermore, the intensity of the high setting 8 may be at least 300 lm.

In operation of the lighting device 1, the intensity (and color temperature) of the light emitted by the lighting unit 2 is changed between at least the aforementioned low, mid and high settings 6-8, namely from the high setting 8 via the mid setting 7 to the low setting 6, and/or from the low setting 6 via the mid setting 7 to the high setting 8.

The high color temperature of the low setting 6 is beneficial for night lighting or nightlights, as it mimics the light from the Moon, which gives a feeling of relaxation that is beneficial for sleep and rest. Light from the Moon, or moonlight, is the light that reaches Earth from the Moon, consisting mostly of sunlight, with some starlight and earthlight, reflected from those portions of its surface which the Sun's light strikes. Moonlight may have, for example, a color temperature of 4100 or 4150 K. Full moon typically provides less than 1 lux illumination. The illumination level depends on where on Earth the Moon is viewed and on the lunar cycle of the Moon. In view of the latter, the control unit 3 may be configured to adjust the intensity and color temperature of the low setting 6 based on data of the lunar cycles of the Moon. For example, at full moon the low setting 6 may have higher intensity and color temperature than at other lunar cycles (moon phases). The data of the lunar cycles of the Moon could be received from the outside via a receiver 9 or stored locally in a clock module 10 of the lighting device 1.

The control unit 3 may be operable to simultaneously and gradually change the intensity and color temperature of the light emitted by the lighting unit 2 between the three settings 6-8, i.e. from the high setting 8 via the mid setting 7 to the low setting 6 and/or vice versa, as indicated by the dotted line 11 in FIG. 2. To this end, the user interface 5 may include input means 12 configured to allow the user to simultaneously and gradually change the intensity and color temperature of the light emitted by the lighting unit 2, for example from the high setting 8 to the mid setting 7 and further to the low setting 6 and/or vice versa (i.e. from the low setting 6 to the high setting 8 via the mid setting 7). The input means 12 is here a sliding button (physical or virtual).

Figure 3:
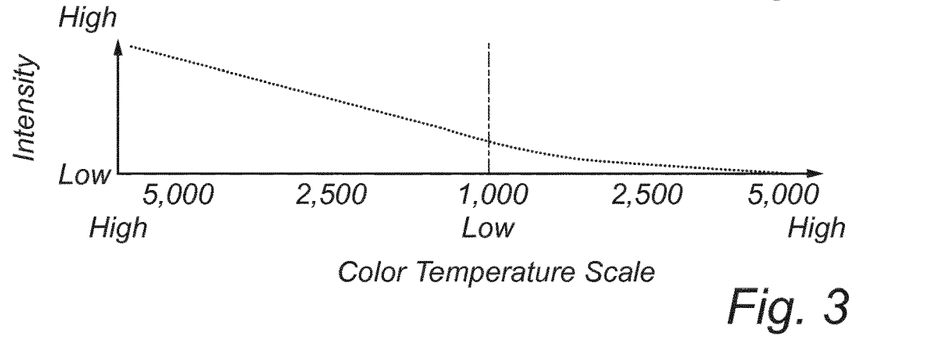
FIG. 3 shows intensity and color temperature according to a variant of the invention.

Furthermore, the control unit 3 may be configured to stop decreasing and start increasing the color temperature of the light emitted by the lighting unit 2 while gradually changing the intensity at a breakpoint lumen output indicated by reference sign 13 in FIG. 2. The breakpoint lumen output 13 may be in the range of 50-100 lm, preferably in the range of 50-80 lm, and more preferably in the range of 50-70 lm. The breakpoint lumen output 13 may also be <80 lm, preferably <70 lm, and more preferably <below 60 lm. For example, if the breakpoint lumen output 13 is 55 lm, switching to a higher color temperature while lowering the intensity happens at a lumen output of 55 lm, to imitate moonlight condition. Furthermore, the simultaneously and gradually change of intensity and color temperature may be linear (FIG. 2) or non-linear (FIG. 3).

Figure 4A:
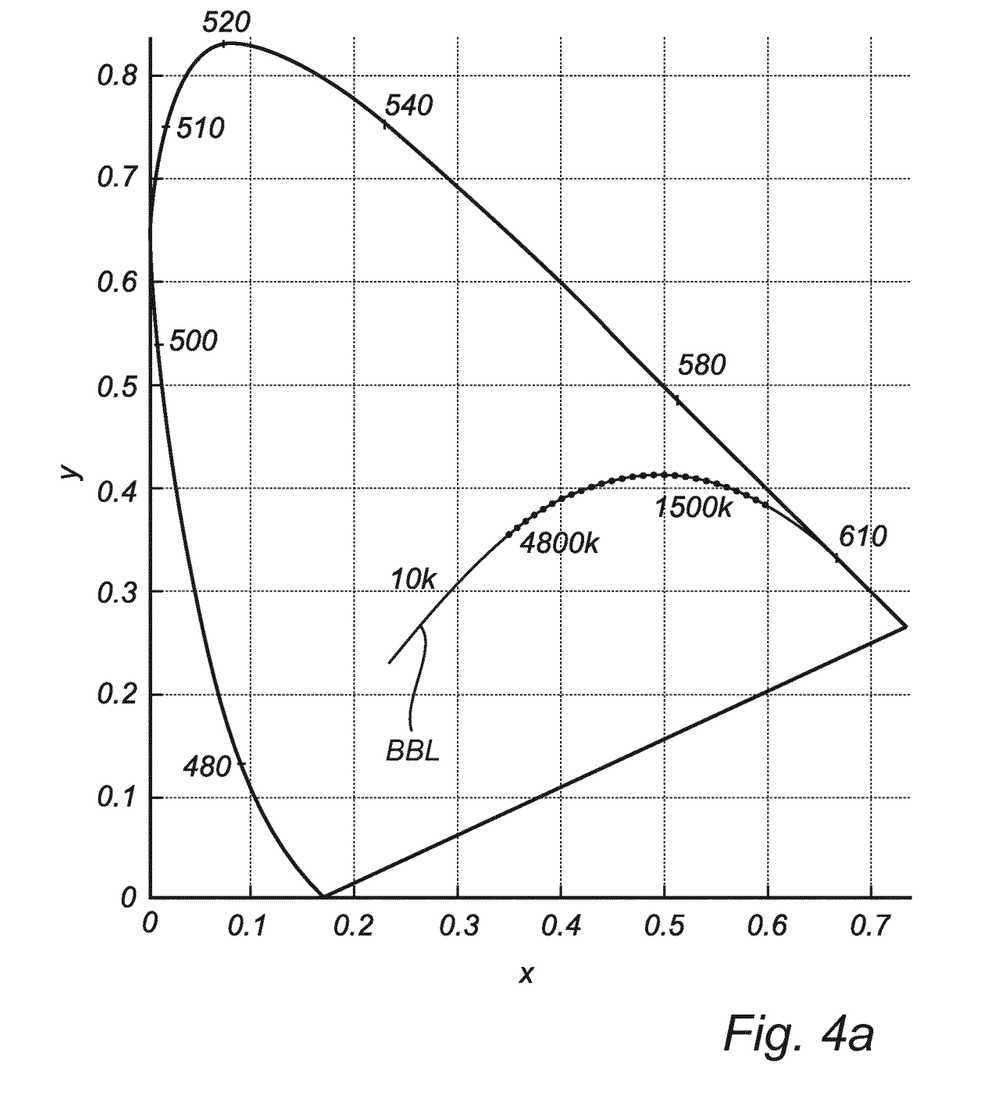
FIGS. 4a-c show various changes in color temperature.
Figure 4B:
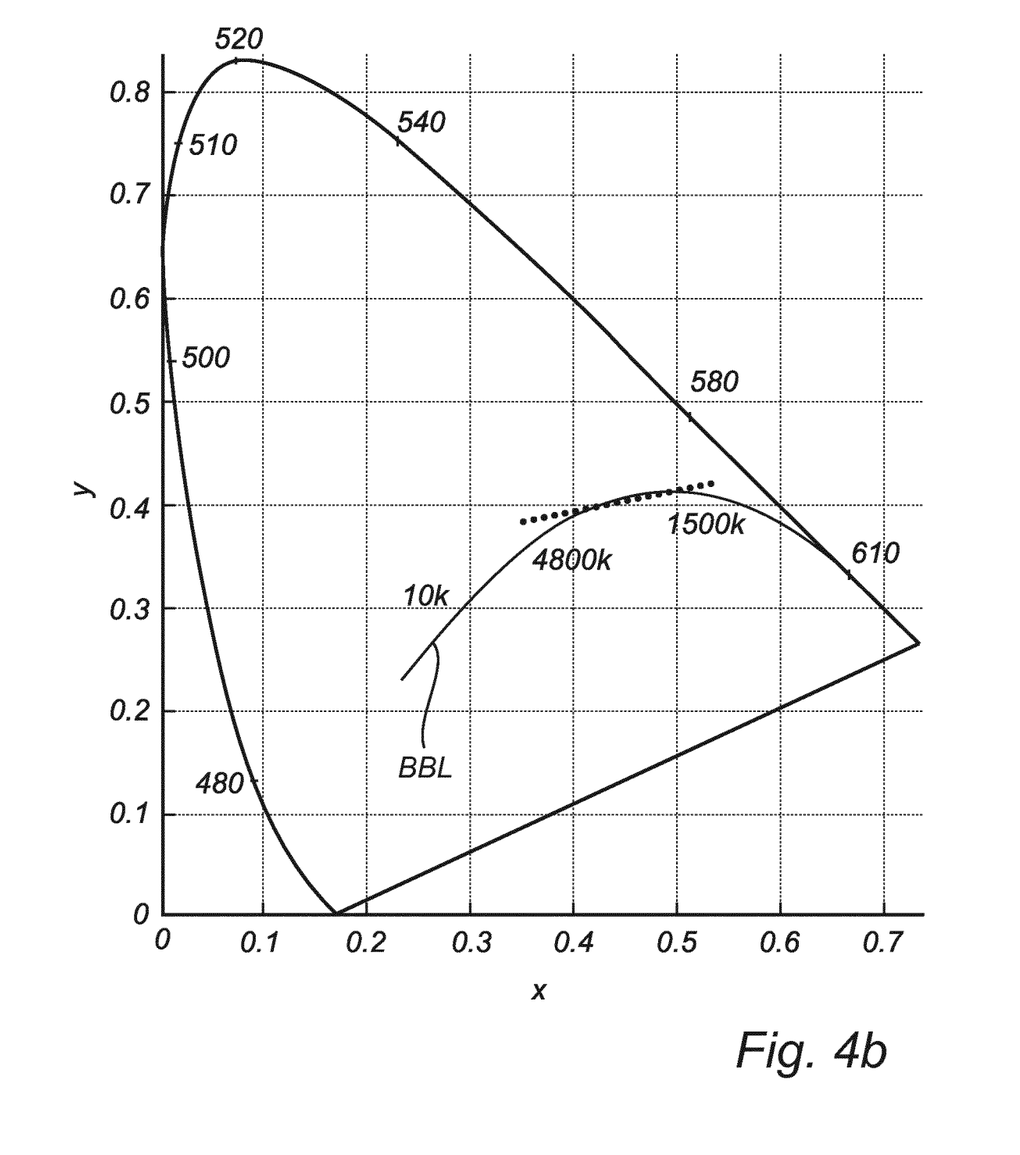
Figure 4C:
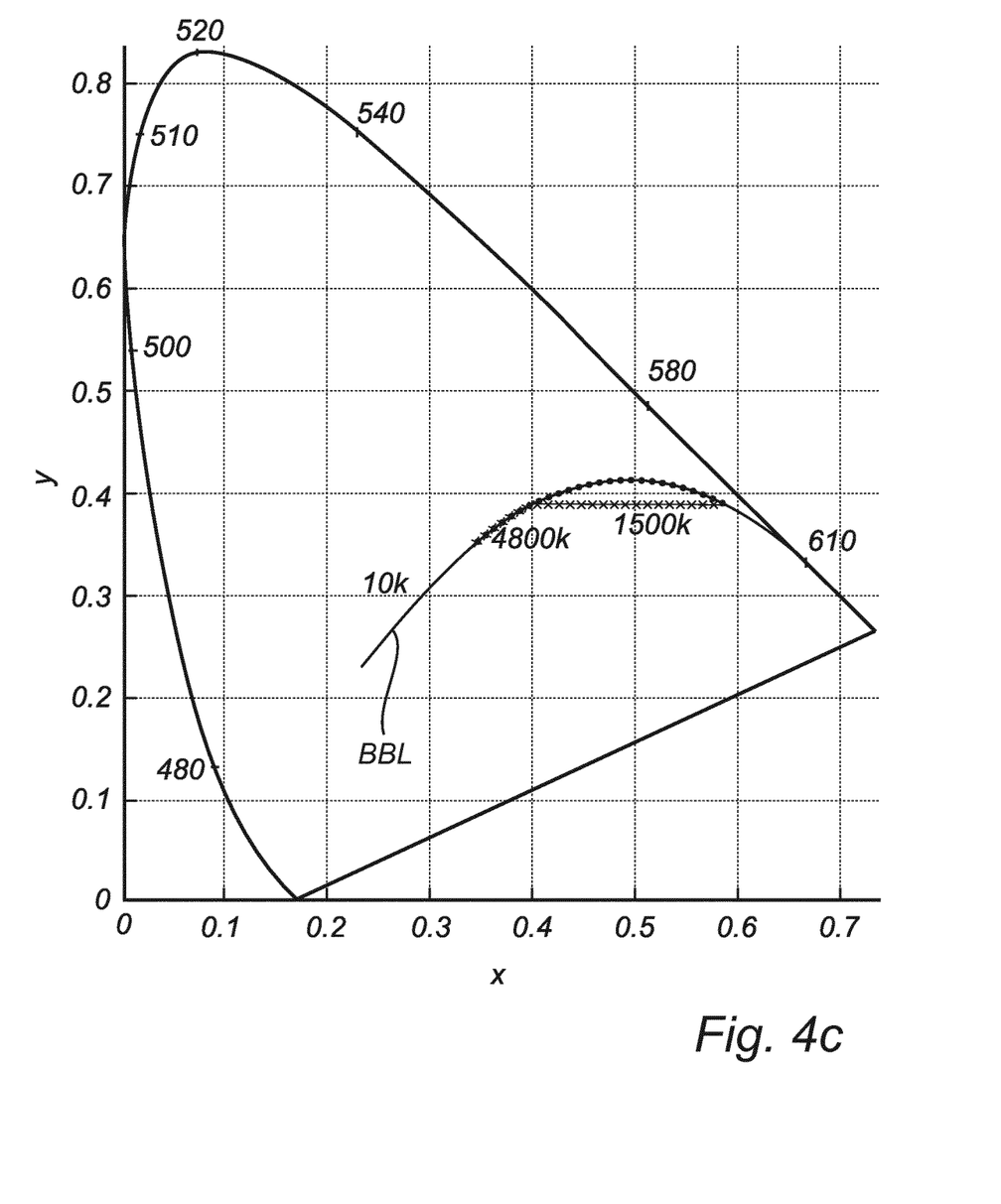

Furthermore, the gradual change in the color temperature of the light emitted by the lighting unit 2 may follow the black body line BBL, see the dotted line in the CIE 1931 xy chromaticity space of FIG. 4a. The gradual change in color temperature may alternatively be close to the BBL (FIG. 4b), for example within 20 standard deviations of color matching (SDCM), more preferably within 15 SDCM, and most preferably within 10 SDCM, for example 5 SDCM from the BBL. In yet another alternative, the gradual change in color temperature may follow the black body line only at high color temperatures (for example >3000K or >4000 K), see FIG. 4c. In FIG. 4c, the gradual change the color temperature between the high and the mid settings 8 and 7 may follow the BBL as indicated by the dotted line, but the gradual change the color temperature between the mid and low settings 7 and 6 only follows the BBL>4000 K as indicated by the "cross-dashed" line.

Furthermore, the light emitted by the lighting unit 2 in the high setting 8 may have a different spectrum than the light emitted by the lighting unit 2 in the low setting 6, even if the emitted light has the same (high) color temperature in both settings. This serves to mimic daylight and nightlight. Sunlight has typically a color temperature in the range from 6000 to 3000 K. Sunset has typically a color temperature in the range from 2000 to 1000 K. Moonlight has typically a color temperature in the range from 3500 to 5000 K. Daylight and nightlight may thus have the same high color temperature. However, the spectrum of the daylight and nightlight may be different.

The light emitted by the lighting unit 2 in the high setting 8 can for example be made with blue light having a wavelength peak in the range of 460 to 480 nm, and the light emitted by the lighting unit 2 in the low setting 6 can be made with blue light having a wavelength peak in the range of 440 to 460 nm. To this end, the lighting unit 2 may comprise red 4a, green 4b and two different blue light sources 4c' and 4c", see FIG. 5. The two blue light sources 4c' and 4c" are selectively activable by a controller 14 and adapted to emit blue light with mutually different wavelength peaks, for example 470 nm for the high setting 8 and 440 nm for the low setting 6. In use, the emitted light in the high setting 8 is made by activating the red 4a, green 4b and the 470 nm blue light source 4c' (but not the 440 nm blue light source 4c"), whereas the emitted light in the low setting 6 is made by activating the red 4a, green 4b and the 440 nm blue light source 4c" (but not the 470 nm blue light source 4c').

In another variant, the light emitted by the lighting unit 2 in the high setting 8 can be made with red light having a wavelength peak in the range of 600 to 650 nm, and the light emitted by the lighting unit 2 in the low setting 6 can be made with red light having a wavelength peak in the range of 650 to 670 nm. To this end, the lighting unit 2 may comprise blue 4c, green 4b and two different red light sources 4a' and 4a", see FIG. 6. The red blue light sources 4a' and 4a" are selectively activable by a controller 14 and adapted to emit red light with mutually different wavelength peaks, for example 625 nm for the high setting 8 and 660 nm for the low setting 6. In use, the emitted light in the high setting 8 is made by activating the blue 4c, green 4b and the 625 nm red light source 4a' (but not the 660 nm red light source 4a"), whereas the emitted light in the low setting 6 is made by activating the blue 4a, green 4b and the 660 nm red light source 4a" (but not the 625 nm red light source 4a').

Figure 5:
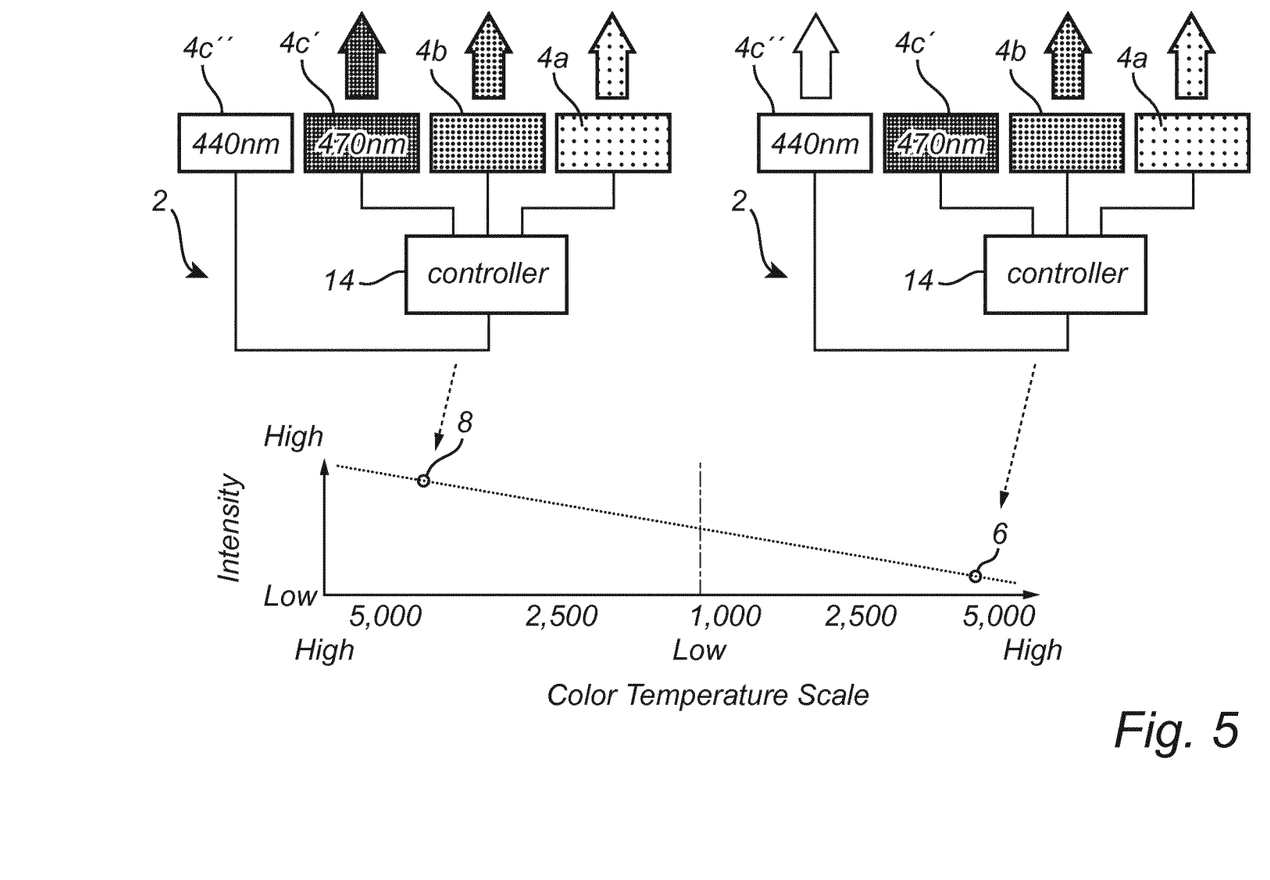
FIGS. 5-7 show variants of the lighting unit of the present lighting device.
Figure 6:
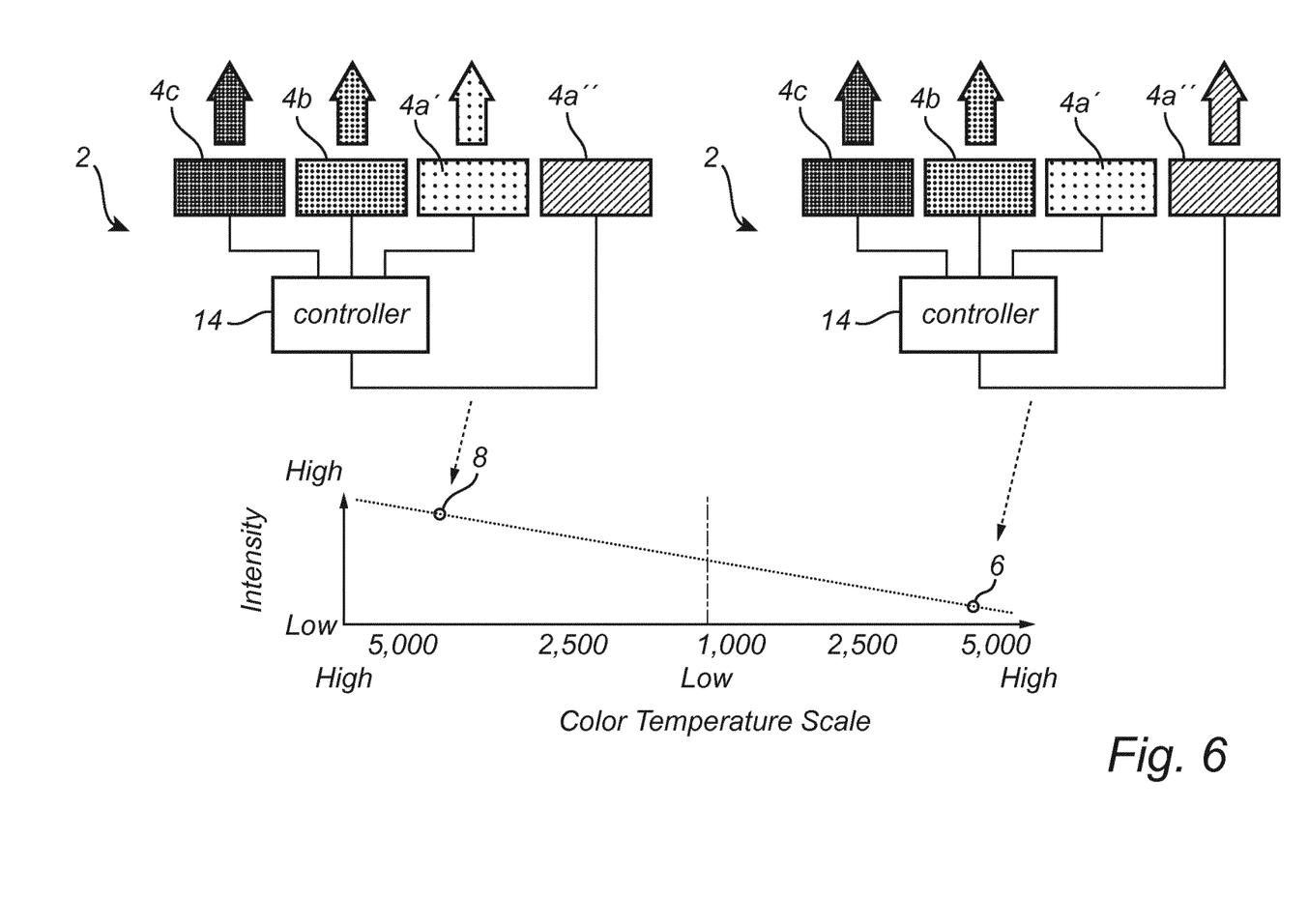

The variants of FIGS. 5 and 6 could be combined. In particular, if the wavelength difference between the two different blue light sources 4c' and 4c" is large, it may be useful to compensate with different red light sources 4a' and 4a".

Figure 7:
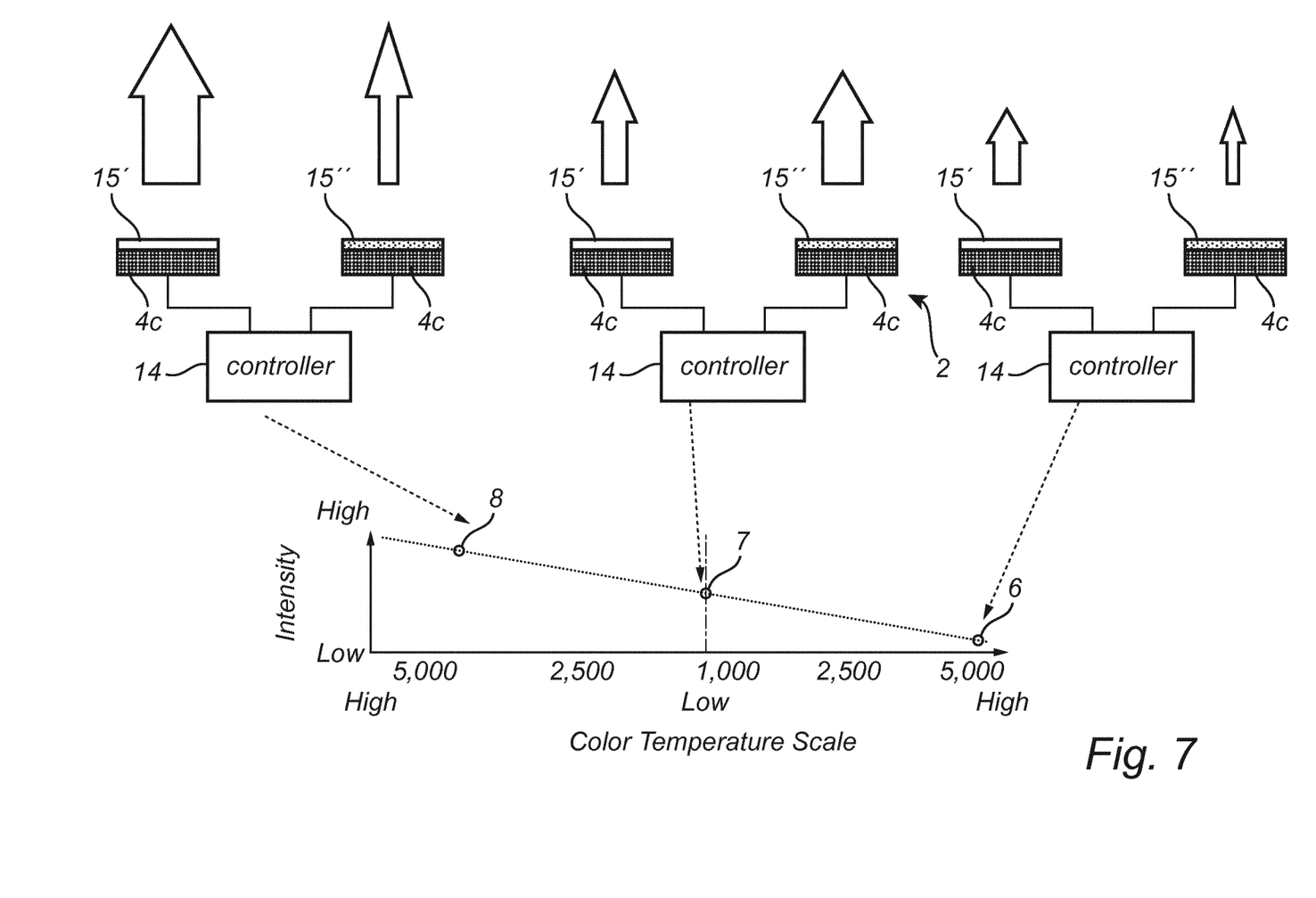

In FIG. 7, the lighting unit 2 comprises phosphor converted light-emitting diodes (LEDs) adapted to emit white light of different color temperatures. Namely, the lighting unit 2 comprises a first blue LED 4c with a phosphor 15' for emitting cold(er) light, and a second blue LED 4c with a different phosphor 15" for emitting warm(er) light. In this way, the high setting 8, mid setting 7 and low setting 6 may be achieved by appropriately combining or mixing light of the phosphor converted light emitting diodes 4c+15' and 4c+15" using only two light sources, or at least only two types of light sources, as schematically illustrated in FIG. 7.

Figure 8:
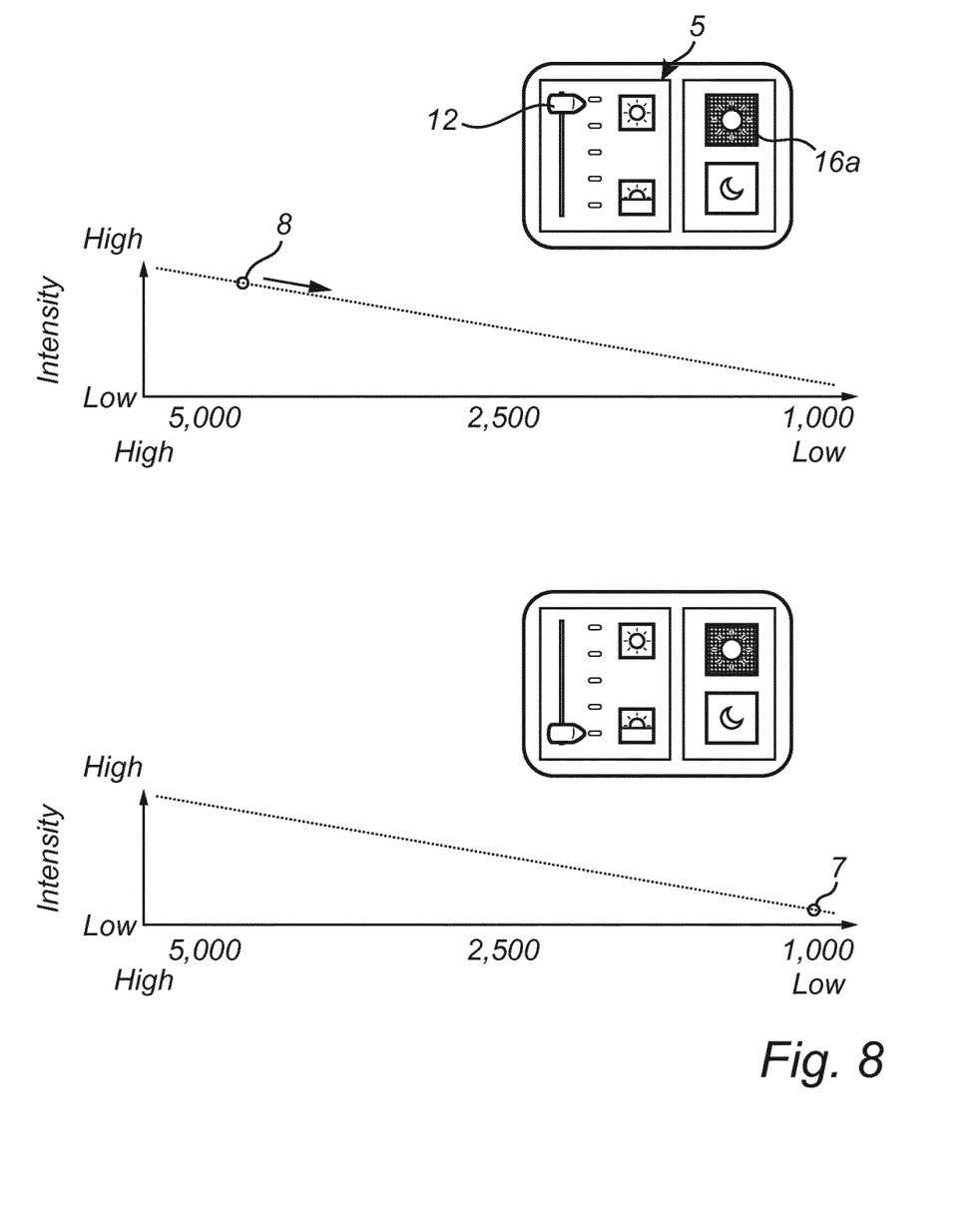
FIGS. 8-11 show variants of the user interface of the present lighting device.
Figure 9:
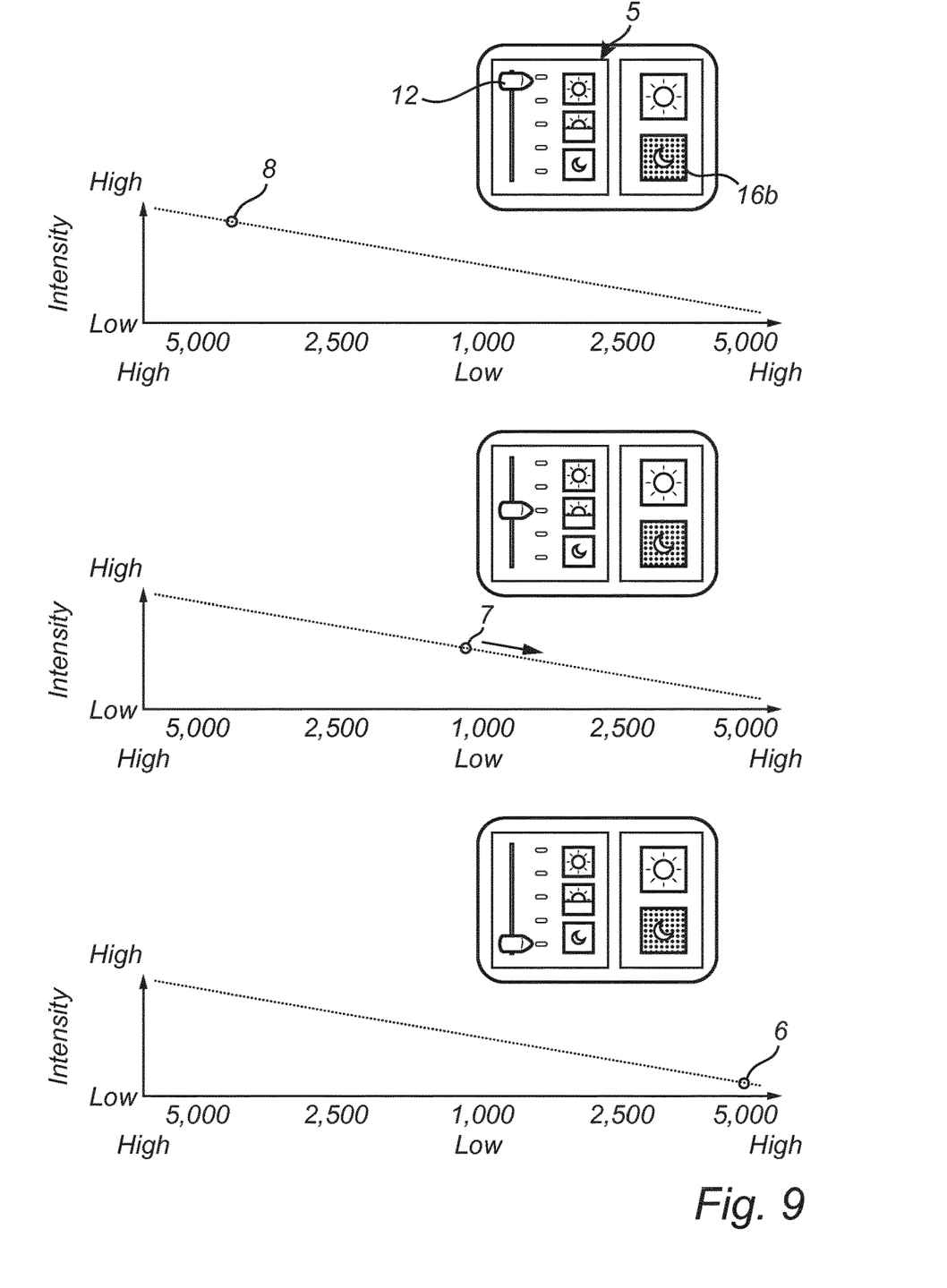

In FIGS. 8-9, the user interface 5 comprises two additional input means 16a-b allowing the user to select between two modes: normal BBL dimming mode and multifunctional dimmable nightlight mode. The normal BBL dimming mode is selected by activating additional input means 16a, and the multifunctional dimmable nightlight mode is selected by activating additional input means 16b. In the normal BBL dimming mode (FIG. 8), the control unit 2 is operable to simultaneously and gradually change the intensity and color temperature of the light emitted by the lighting unit between the high setting 8 and the mid setting 7, as a response to the user manipulating input means 12. In the multifunctional dimmable nightlight mode (FIG. 9), the control unit 2 is operable to simultaneously and gradually change the intensity and color temperature of the light emitted by the lighting unit between the high setting 8 and the low setting 6 via the mid setting 7, as a response to the user manipulating input means 12.

Figure 10:
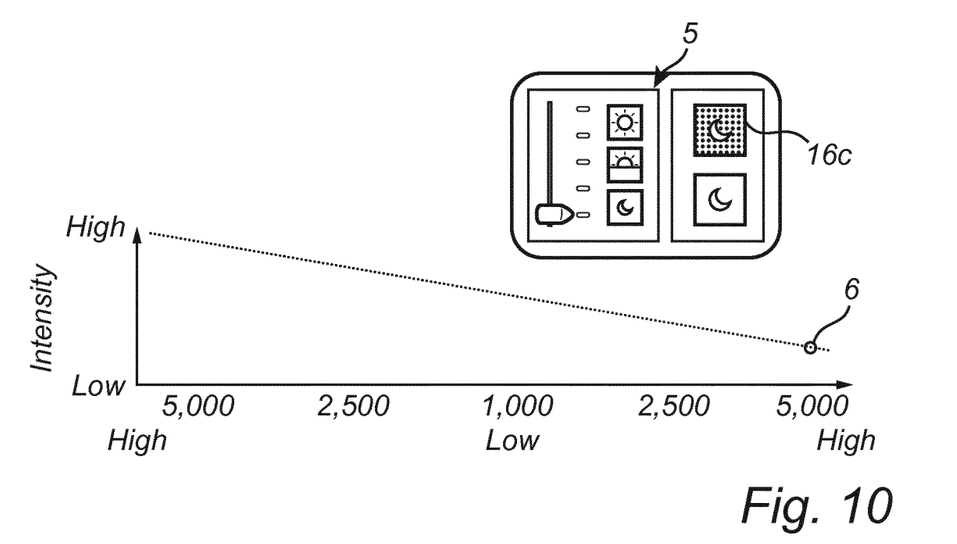
Figure 11:
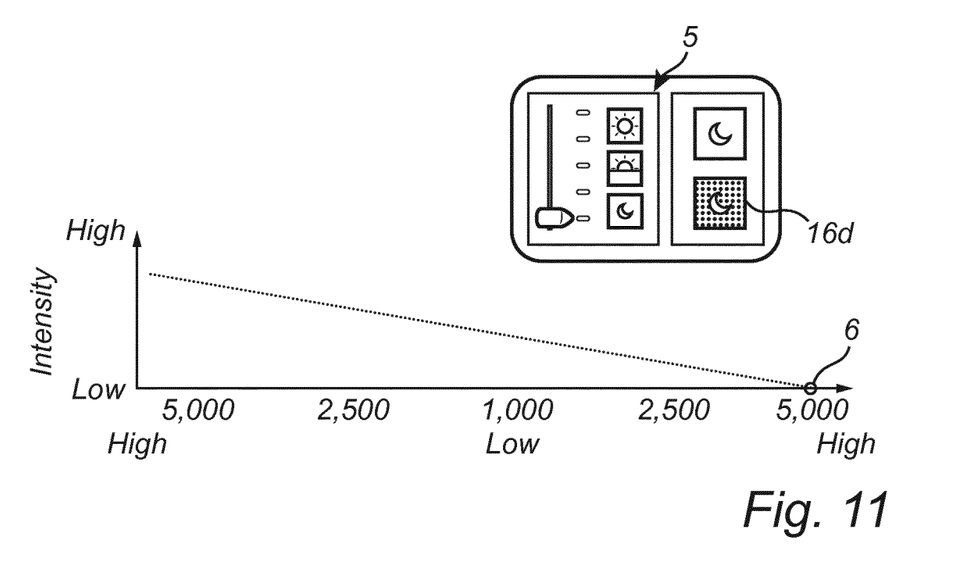

In FIGS. 10-11, the user interface 6 comprises two additional input means 16c-d allowing the user to select between a first lighting setting and a second lighting setting. The first lighting setting is selected by activating additional input means 16c, and the second lighting setting is selected by activating additional input means 16d. In the first lighting setting (FIG. 10), the intensity of the low setting 6 is >0, i.e. the lighting unit 2 is always on. In the second lighting setting (FIG. 11), the intensity of the low setting 6 is 0, i.e. the lighting unit 2 is completely off.

Figure 12:
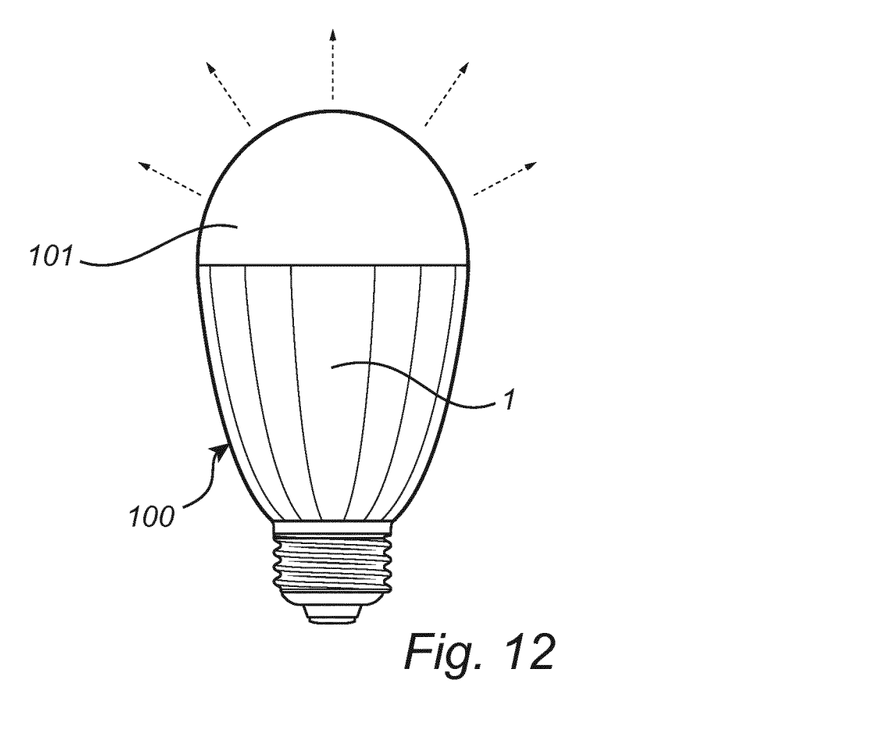
FIGS. 12-13 show different lighting apparatuses according to an aspect of the present invention.
Figure 13:
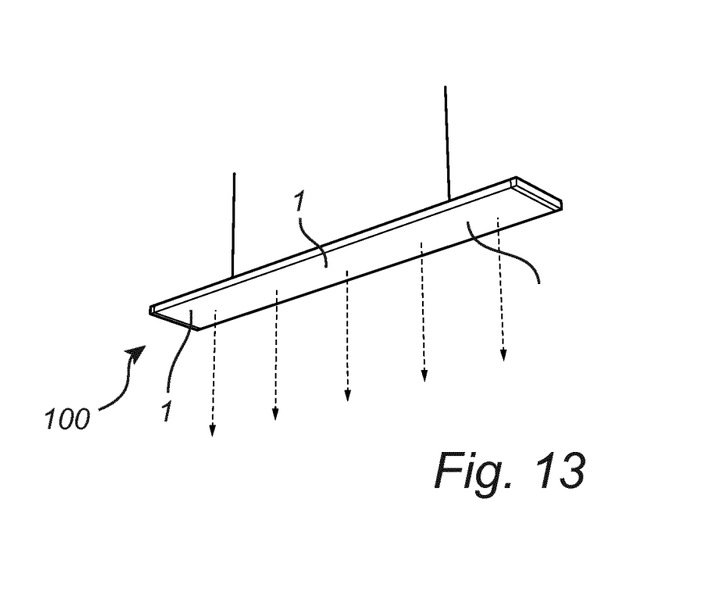

FIGS. 12-13 show different lighting apparatuses each comprising at least one lighting device 1. In FIG. 12, the lighting apparatus is a lamp 100a. In FIG. 13, the lighting apparatus is a luminaire 100b. Each lighting apparatus may comprise a light exit window or surface, for example bulb 101 of the lamp 100a. Given the light exit window or surface 101, the aforementioned breakpoint 13 may be defined as an intensity at the light exit window or surface 101 below 0.5 $lm/cm^2$, preferably below 0.4 $lm/cm^2$, and more preferably below 0.3 $lm/cm^2$.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lighting device comprising a lighting unit configured to emit light and a control unit configured to control the light emitted by the lighting unit, wherein the control unit is configured to change the intensity of the light emitted by the lighting unit at least from a high setting via a mid setting to a low setting and/or vice versa, wherein the intensity of the high setting is greater than the intensity of the mid setting, wherein the intensity of the mid setting is greater than the intensity of the low setting, and wherein the low setting and the high setting each gives a higher color temperature of the light emitted by the lighting unit than the mid setting, and wherein the color temperature of the low setting is greater than the color temperature of the high setting.

2. A lighting device according to claim 1, wherein the control unit is operable to simultaneously and gradually change the intensity and color temperature of the light emitted by the lighting unit between said three settings.

3. A lighting device according to claim 2, wherein the control unit is configured to stop decreasing and start increasing the color temperature of the light emitted by the lighting unit, while changing the intensity, at a breakpoint lumen output of the lighting unit in the range of 50-100 lm, preferably in the range of 50-80 lm, and more preferably in the range of 50-70 lm.

4. A lighting device according to claim 2, wherein the gradual change in color temperature of the light emitted by the lighting unit follows the black body line.

5. A lighting device according to claim 1, wherein the control unit comprises a user interface including input means configured to allow a user to simultaneously and gradually change the intensity and color temperature of the light emitted by the lighting unit from the high setting to the mid setting and further to the low setting and/or vice versa.

6. A lighting device according to claim 1, wherein the high setting has a color temperature above 2700K, preferably above 3000K, and more preferably above 3500K, wherein the mid setting has a color temperature below 2700K, preferably below 2600K, and more preferably below 2500K, and wherein the low setting has a color temperature above 2700K, preferably above 3000K, and more preferably above 3500K.

7. A lighting device according to claim 1, wherein the low setting has a color temperature in the range from 3900 to 4300K.

8. A lighting device according to claim 1, wherein the light emitted by the lighting unit in the high setting has a different spectrum than the light emitted by the lighting unit in the low setting.

9. A lighting device according to claim 8, wherein the lighting unit comprises at least one of:
   at least two selectively activable blue light sources adapted to emit blue light with mutually different wavelength peaks; and
   at least two selectively activable red light sources adapted to emit red light with mutually different wavelength peaks.

10. A lighting device according to claim 1, wherein the lighting unit comprises a first phosphor converted light emitting diode adapted to emit white light of a first color temperature and a second phosphor converted light emitting diode adapted to emit white light of a second color temperature which is different than the first color temperature.

11. A lighting device according to claim 1, wherein the control unit is configured to adjust the intensity and color temperature of the low setting based on data of the lunar cycles of the Moon.

12. A lighting apparatus comprising at least one lighting device according to claim 1.

13. A lighting apparatus according to claim 12, further comprising a light exit window or surface, wherein the control unit of each lighting device is configured to stop decreasing and start increasing the color temperature of the light emitted by the lighting unit, while changing the intensity, at an intensity at the light exit window or surface below 0.5 $lm/cm^2$, preferably below 0.4 $lm/cm^2$, and more preferably below 0.3 $lm/cm^2$.

14. A method of controlling light emitted by a lighting unit, which method comprises:
   changing the intensity of the light emitted by the lighting unit at least from a high setting via a mid setting to a low setting and/or vice versa, wherein the intensity of the high setting is greater than the intensity of the mid setting, wherein the intensity of the mid setting is greater than the intensity of the low setting, and wherein the low setting and the high setting each gives a higher color temperature of the light emitted by the lighting unit than the mid setting, and wherein the color temperature of the low setting is greater than the color temperature of the high setting.

* * * * *